(12) United States Patent
Hübner et al.

(10) Patent No.: US 11,716,035 B2
(45) Date of Patent: Aug. 1, 2023

(54) ELECTROMECHANICAL LINEAR DRIVE WITH TRANSMISSION ELEMENT

(71) Applicant: Physik Instrumente (PI) GmbH & Co. KG, Karlsruhe (DE)

(72) Inventors: Reinhard Hübner, Waldbronn (DE); Dominik Bocskai, Iffezheim (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 154 days.

(21) Appl. No.: 17/425,518

(22) PCT Filed: Jan. 27, 2020

(86) PCT No.: PCT/EP2020/051856
§ 371 (c)(1),
(2) Date: Jul. 23, 2021

(87) PCT Pub. No.: WO2020/152365
PCT Pub. Date: Jul. 30, 2020

(65) Prior Publication Data
US 2022/0029559 A1    Jan. 27, 2022

(30) Foreign Application Priority Data
Jan. 25, 2019 (DE) .................... 10 2019 200 943.3

(51) Int. Cl.
*H02N 2/02* (2006.01)
*H02N 2/04* (2006.01)

(52) U.S. Cl.
CPC .............. *H02N 2/025* (2013.01); *H02N 2/04* (2013.01)

(58) Field of Classification Search
CPC .................................. H02N 2/025; H02N 2/04
See application file for complete search history.

(56) References Cited

U.S. PATENT DOCUMENTS

| 7,821,727 B2 | 10/2010 | Shi et al. |
| 7,956,515 B2 | 6/2011 | Honma et al. |

(Continued)

FOREIGN PATENT DOCUMENTS

| DE | 102005026708 B4 | 5/2007 |
| DE | 102014205280 B3 | 6/2015 |

(Continued)

OTHER PUBLICATIONS

Office Action (Notice of Grounds of Rejection) dated Aug. 2, 2022, by the Japanese Patent Office in corresponding Japanese Patent Application No. 2021-542542, and an English Translation of the Office Action. (14 pages).

(Continued)

*Primary Examiner* — Emily P Pham
(74) *Attorney, Agent, or Firm* — Buchanan Ingersoll & Rooney PC

(57) ABSTRACT

The present disclosure relates to an electromechanical linear drive having a housing, an electromechanical drive unit, a transmission element which is coupled to the electro-mechanical drive unit, and an element to be driven which is in frictional contact with the transmission element, where the transmission element is mounted on at least two bearing points with respect to the housing. Improved accessibility to the element to be driven and a longer adjustment path of the element to be driven can be achieved by placing the element to be driven in frictional contact with the transmission element at a point of engagement outside of all bearing points.

20 Claims, 2 Drawing Sheets

(56) References Cited

U.S. PATENT DOCUMENTS

| | | | |
|---|---|---|---|
| 9,154,055 | B2 | 10/2015 | Morita et al. |
| 2002/0030422 | A1 | 3/2002 | Hata |
| 2005/0253483 | A1* | 11/2005 | Okamoto ............... H02N 2/025 |
| | | | 310/323.13 |
| 2008/0297000 | A1 | 12/2008 | Nishiyama et al. |
| 2009/0190242 | A1 | 7/2009 | Shi et al. |
| 2010/0052474 | A1 | 3/2010 | Honma et al. |
| 2010/0102645 | A1* | 4/2010 | Trietz ....................... H02N 2/04 |
| | | | 310/12.31 |
| 2012/0299442 | A1 | 11/2012 | Morita et al. |
| 2016/0322920 | A1* | 11/2016 | Hata ........................ H02N 2/04 |
| 2017/0099017 | A1 | 4/2017 | Hübner |

FOREIGN PATENT DOCUMENTS

| | | |
|---|---|---|
| EP | 1983585 A2 | 10/2008 |
| EP | 2590315 A1 | 5/2013 |
| JP | H08149860 A | 6/1996 |
| JP | 2000035083 A | 2/2000 |
| JP | 2000077737 A | 3/2000 |
| JP | 2006262580 A | 9/2006 |
| JP | 2009071990 A | 4/2009 |
| JP | 2009187013 A | 8/2009 |
| JP | 2010057362 A | 3/2010 |
| JP | 2010081778 A | 4/2010 |
| WO | 2011096199 A1 | 8/2011 |

OTHER PUBLICATIONS

International Search Report (PCT/ISA/210) and Written Opinion (PCT/ISA/237) dated Apr. 15, 2020, by the European Patent Office as the International Searching Authority for International Application No. PCT/EP2020/051856.

Office Action (Notice of Grounds of Rejection) dated Mar. 14, 2023, by the Japanese Patent Office in corresponding Japanese Patent Application No. 2021-542542, and an English Translation of the Office Action. (11 pages).

* cited by examiner

ELECTROMECHANICAL LINEAR DRIVE WITH TRANSMISSION ELEMENT

The present invention relates to an electromechanical linear drive, in particular for the precise positioning of an element to be driven.

The present invention relates in particular to a linear drive comprising an electromechanical drive unit, a transmission element coupled thereto, and an element to be driven which can be moved along the transmission element by deformation motions of the electromechanical drive unit due to a stick-slip effect Drives of this type are known from DE 10 2005 026 708 B4 and JP H 08149860.

DE 10 2005 026 708 B4 discloses a positioner in which a structural unit is slidable by way of a stick-slip drive along a translation axis received in a housing and actuated by an actuator. The translation axis is there completely received in the housing and coupled to the housing by way of flexure hinges for securing the translation axis or the actuator against rotation and lateral displacement. The use of flexure hinges, which must be firmly connected to the end surfaces of the translation axis by adhesive bonding, has a disadvantageous effect there on production costs and the installation effort.

JP H 08149860 discloses a similar drive, the housing of which comprises a recess in which a support axis of an element to be driven is arranged, and a further recess in which an electromechanical drive unit is arranged Accordingly, the housing has a length which makes it possible to completely receive the support axis in its longitudinal extension and the electromechanical drive unit. In addition to the large longitudinal dimension of the housing, the restricted accessibility to the element to be driven is also disadvantageous due to the surrounding housing in this configuration. It is disadvantageous in particular that the adjustment travel of the element to be driven is also limited due to the surrounding housing.

In view of the above-mentioned prior art, the object of the present invention is therefore to provide an electromechanical linear drive in a more simplified and compact configuration, which is consequently characterized by low production costs and a low assembly effort and enables unrestricted access to the element to be driven and an extended adjustment travel of the element to be driven.

The present object is satisfied by an electromechanical linear drive according to claim 1. It comprises a housing, an electromechanical drive unit, a transmission element which is coupled to the electromechanical drive unit, an element to be driven which is in frictional contact with the transmission element, where the transmission element is mounted on at least two bearing points with respect to the housing and the element to be driven is in frictional contact with the transmission element at a point of engagement outside of all bearing points. Due to the point at which the element to be driven is in engagement with the transmission element being outside the bearing points, a simple and compact configuration of the linear drive with unrestricted accessibility to the element to be driven can be ensured. Furthermore, the adjustment travel of the element to be driven is not restricted to the distance between the bearing points.

In addition, the invention provides that a first section of the transmission element, which is located between the bearing points, runs within the housing and/or a second section of the transmission element, which is located outside of all bearing points, protrudes from the housing. As a result, the adjustment travel of the element to be driven is disposed outside the housing, whereby it is not restricted to the dimensions of the housing.

Preferred embodiments are the object of the dependent claims.

It can be useful to have the electromechanical drive unit be arranged in the housing, preferably in a positive force-fit manner, and form one of the bearing points of the transmission element. In this way, a combination of functions with regard to the drive and the mounting of the transmission element is obtained in the electromechanical drive unit.

It can be useful to have the electromechanical linear drive comprise a guide element which forms one of the bearing points of the transmission element, where the guide element mounts the transmission element to be slidable preferably in the axial direction, where the guide element is preferably configured as a bushing through which the transmission element protrudes. This configuration provides a sliding bearing for the transmission element.

It can furthermore be useful to have the guide element comprise a part which is located within the housing and a part which is located outside of the housing. This division allows the respective parts of the guide element to be individually customized to their specific function. While the part that is located within the housing must enable good attachment to the housing, the part that is located outside of the housing can be customized, in particular, to guide the transmission element.

It can be useful to have the electromechanical linear drive comprises a preloading device which is configured to preload the electromechanical drive unit against the housing, preferably against an inner surface of the housing, where the preloading device can preferably be screwed into the housing, and particularly preferably comprises a diaphragm spring. A high preload force can be applied optimally to the electromechanical drive unit in this configuration with which the working range of the drive unit can be adjusted.

It can prove to be useful to have the electromechanical linear drive comprise an intermediate element which is firmly connected to the transmission element and which is arranged at least in sections between the transmission element and the electromechanical drive unit, preferably in such a way that the preload force of the preloading device can be applied onto the electromechanical drive unit via the intermediate element. Since the intermediate element assumes the function of an adapter, transmission elements with different diameters or cross-sectional shapes can be coupled to the same drive unit.

It can be useful to have the electromechanical drive unit be made of piezoelectric or electrostrictive or magnetostrictive material.

It can prove to be advantageous to have the electromechanical drive unit have a ring shape or a hollow cylindrical shape and/or the transmission element is formed to be rod-shaped, preferably with a circular cross-section, where the intermediate element is preferably arranged to be concentric to the electromechanical drive unit.

It can be useful to have the intermediate element be connected to the transmission element and/or to the electromechanical drive unit in a positive substance-fit manner. A loss-free connection of the transmission element to the electromechanical drive unit can be made possible by adhesive bonding. Furthermore, the adhesive connection realizes a radial mounting of the transmission element.

It can prove to be practical to have the transmission element be formed from a harder material than the guide element, where the transmission element is preferably made of ceramic material and the guide element preferably comprises plastic material and/or is preferably made of plastic material, where the plastic material comprises additives that improve sliding and/or reduce wear.

It can also prove useful to have the transmission element protrude with an interference fit through the guide element. Play-free guidance of the transmission element can be made possible with the selective choice of materials and the diameter of the transmission element and the guide element.

It can be useful to have the first section of the transmission element be shorter than the second section of the transmission element. As a result, a long adjustment path of the element to be driven can be provided for a compact housing.

It can be advantageous to have the electromechanical drive unit be excitable to perform deformation motions by applying electrical voltages, where the transmission element follows the deformation motions of the electromechanical drive unit and the resulting motions of the transmission element are transferable to the element to be driven so that the latter can be moved with a defined thrust force along the axial direction of the transmission element.

It can be useful to have the preload force applied by the preloading device to the electromechanical drive unit be at least ten times the thrust force acting upon the element to be driven.

TERMS AND DEFINITIONS

The stick-slip effect describes the slip stick of solid bodies moving against one another and is known from prior art. The adjustment of the element to be driven along the transmission element by way of the stick-slip effect comprises a sticking phase in which the element to be driven is in engagement with the transmission element due to static friction, and a slipping phase in which the element to be driven moves relative to the transmission element.

The term thrust refers to the usable force of the electromechanical drive unit that can be exerted upon an element to be driven.

The term blocking force denotes the preload force acting upon the electromechanical drive unit at which, when the maximum possible electrical voltage is applied, the drive unit does not show any deformation as compared to the mechanically and electrically unloaded state.

DETAILED DESCRIPTION OF THE PREFERRED EMBODIMENTS

Figure 1:
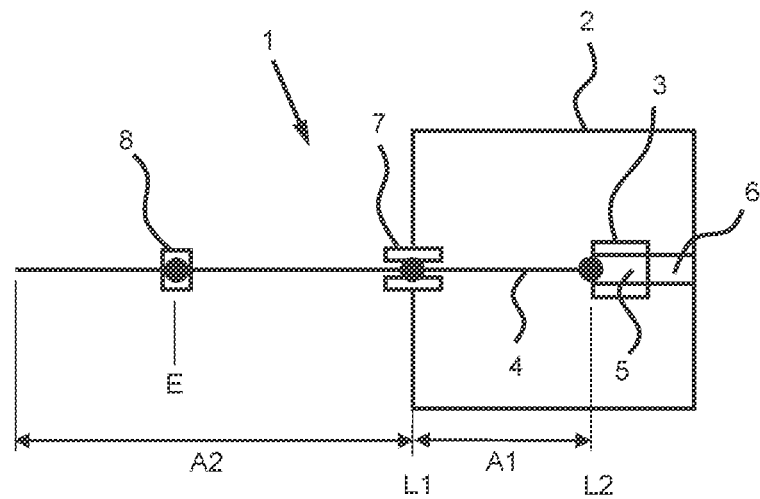
FIG. 1 shows a schematic representation of the linear drive according to the invention.

FIG. 1 illustrates the principle of the linear drive according to the invention in a schematic representation.

A transmission element 4, which is coupled to an electromechanical drive unit 3, is mounted on a housing 2 at two bearing points L1 and L2 by way of a guide element 7 or an intermediate element 5 adjustable with a preloading device 6. An element 8 to be driven is in engagement at a point E (point of engagement) with transmission element 4 by way of a frictional contact. Point of engagement E is located outside of bearing points L1 and L2.

Figure 2:
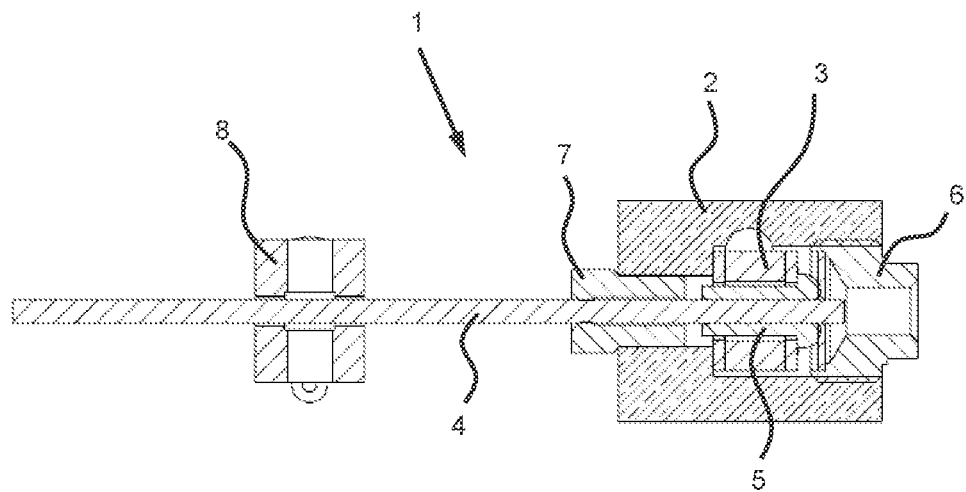
FIG. 2 shows a cross-sectional view of an embodiment according to the invention of the linear drive.
Figure 3:
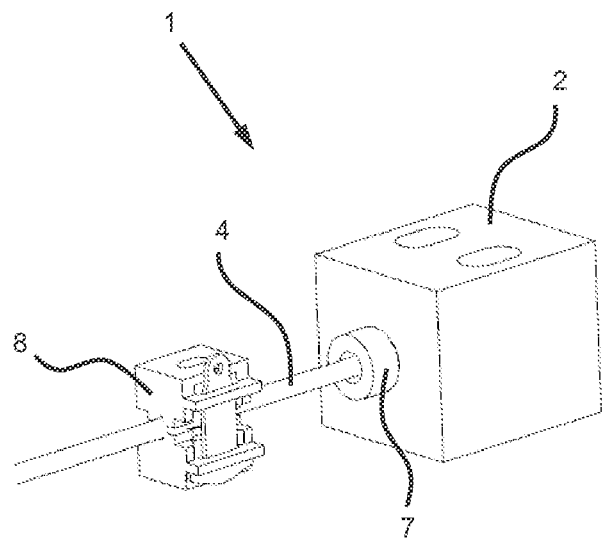
FIG. 3 shows a perspective view of the linear drive according to FIG. 1.

A detailed embodiment of the linear drive according to the invention shall be described below with reference to FIGS. 2 and 3.

Electromechanical linear drive 1 contains housing 2 which comprises a passage bore with a jump in diameter. A ring-shaped electromechanical drive unit 3 is arranged in housing 2 such that a face surface of electromechanical drive unit 3 is supported against an inner surface of housing 2 which is provided due to the jump in diameter of the passage bore. The face surface of electromechanical drive unit 3 is there adhesively bonded to the inner surface of housing 2. Transmission element 4, which is preferably formed having the shape of a rod and with a circular cross section, is coupled to electromechanical drive unit 3. Transmission element 4 has such an extension in the axial direction that a section A1 of transmission element 4 runs within housing 2 and a further, preferably larger, section A2 of transmission element 4 protrudes from housing 2 (see FIG. 1). In the present embodiment, a hollow cylindrical intermediate element 5 is inserted into the opening of ring-shaped electromechanical drive unit 3, where a collar of intermediate element 5 is supported on the further face surface of electromechanical drive element 3. In a preferred embodiment, intermediate element 5 is adhesively bonded to the electromechanical drive unit. Transmission element 4 is arranged such that it protrudes through the opening of intermediate element 5 and, in a preferred embodiment, is adhesively bonded to intermediate element 5. Transmission element 4 is thus firmly connected to electromechanical drive unit 3.

Electromechanical drive units are typically preloaded for proper operation. The working range of electromechanical drive unit 3 is set in a selective manner by the preload. In particular, the balance of the deformation motions of electromechanical drive unit 3 can thus be adjusted. For this purpose, a preloading device 6, which is substantially embodied by a screw, is provided in the passage bore at one end of housing 2. For this purpose, the corresponding section of the passage bore is provided with a thread into which preloading device 6 can be screwed. In the present embodiment, preloading device 6 can apply a high preload force optimally onto electromechanical drive unit 3 via the collar on intermediate element 5. The preload force is approximately ⅓ of the blocking force of electromechanical drive unit 3. For precise adjustment of the preload force, preload device 6 comprises a diaphragm spring which is arranged between the screw and the collar of intermediate element 5. The diaphragm spring is a pure compression spring which is provided exclusively for the axial preloading of electromechanical drive unit 3 and does not contribute to the mounting of transmission element 4.

A guide element 7 in the form of a cylindrical bushing is inserted into the passage bore on the other side of housing 2. Guide element 7 there comprises a part which is located within housing 2 and a part which is located outside of housing 2. Guide element 7 is preferably adhesively bonded and/or pressed or screwed into housing 2. Transmission element 4 protrudes through guide element 7. Play-free guidance of transmission element 4 by guide element 7 is there provided at least in sections, preferably at the end section of guide element 7 at which transmission element 4 protrudes from housing 2. Guide element 7 therefore corresponds to a sliding bearing which, as a first bearing point L1, supports transmission element 4 on housing 2 to be slidable in the axial direction and immovable perpendicular to the axial direction. A second bearing point L2 in housing 2 is provided by way of the fixed connection from transmission element 4 to electromechanical drive unit 3 which is affixed in housing 2 by preloading device 6.

The above-mentioned play-free guidance of transmission element 4 in guide element 7 is implemented in particular by the choice of materials and the diameter of transmission element 4 and guide element 7. For this purpose, transmission element 4 is made of a harder material than guide element 7. Transmission element 4 is preferably made of a ceramic material and guide element 7 is made of plastic material or at least comprises plastic material. The plastic material can comprise additives that improve sliding and/or reduce wear. The outer diameter of transmission element 4 is oversized compared to the inner diameter of guide element 7, as a result of which a corresponding interference fit prevails between transmission element 4 and guide element 7. Transmission element 4 and guide element 7 are preferably matched to one another in such a way that the interference fit prevails in the end section of guide element 7 at which transmission element 4 protrudes from guide element 7. This end section of guide element 7 is disposed in the part of guide element 7 that is located outside of housing 2. As a result, bearing point L1 is located outside of housing 2. Due to the choice of materials and diameters described, transmission element 4 independently works out a play-free guide from the material of guide element 7. The frictional force between guide element 7 and transmission element 4, i.e. the axial force that needs to be applied to push transmission element 4 through guide element 4 is in the range: 0.1 thrust<frictional force<thrust.

The part of guide element 7 that is located within housing 2 is only suitable to a limited extent for the formation of a defined fit, since, for example, in the case of a pressed-in guide element 7, forces from housing 2 act upon this part of guide element 7.

Furthermore, the guidance of transmission element 4 by the above-described end section of guide element 7 results in a large distance between bearing points L1 and L2, where the forces acting upon bearing points L1 and L2 are able to be kept low due to the respective lever lengths. In the present embodiment, the distance between bearing points L1 and L2 is approximately twice the axial length of electromechanical drive unit 3.

By applying electrical voltages, electromechanical drive unit 3 can be excited to translatory deformation motions which are transmitted to coupled transmission element 4. Element 8 to be driven, which is in frictional contact at point of engagement E on second section A2 of transmission element 4 protruding from housing 2, is moved by the translatory motions of transmission element 4 and the above-described stick-slip effect with a defined thrust along the axial direction of transmission element 4. Element 8 to be driven can be precisely positioned along transmission element 4 by way of a selective electrical actuation of electromechanical drive unit 3.

Figure 4:
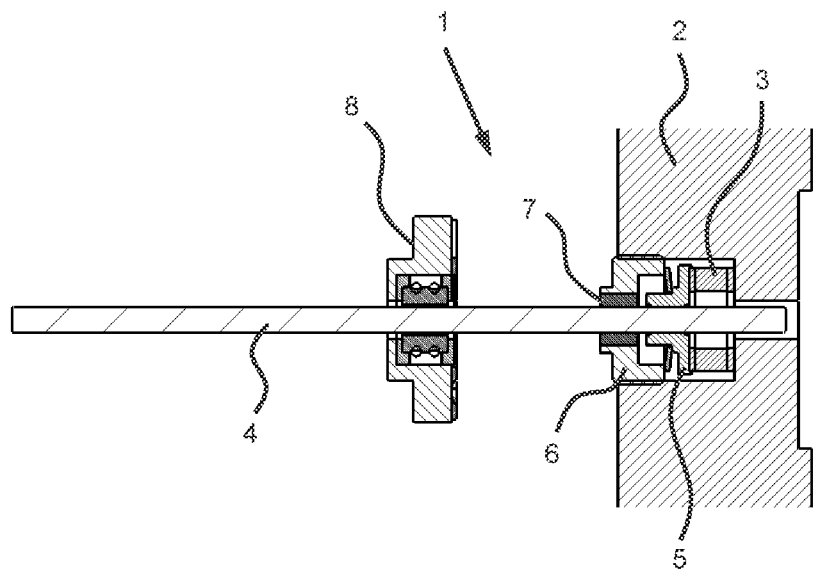
FIG. 4 shows a cross-sectional view of a further embodiment according to the invention of the linear drive.

The preload force applied by preloading device 6 upon electromechanical drive unit 3 is typically twenty times, at least ten times, the thrust force acting upon element 8 to be driven FIG. 4 shows a further embodiment of the linear drive. The difference to the first embodiment is substantially that guide element 7 is integrated into preloading device 6 and transmission element 4 protrudes through preloading device 6. In this way, the electromechanical linear drive can be formed to be even more compact. In this embodiment, the distance between bearing points L1 and L2 corresponds approximately to the axial length of electromechanical drive unit 3.

LIST OF REFERENCE CHARACTERS 1 electromechanical linear drive
2 housing
3 electromechanical drive unit
4 transmission element
5 intermediate element
6 preloading device
7 guide element
8 element to be driven
A1 first section of the transmission element
A2 second section of the transmission element
E point of engagement of the element to be driven with the transmission element
L1 first bearing point of the transmission element
L2 second bearing point of the transmission element

The invention claimed is:

1. An electromechanical linear drive, comprising:
   a housing;
   an electromechanical drive unit;
   a transmission element which is coupled to said electromechanical drive unit; and
   an element to be driven which is in frictional contact with said transmission element, wherein:
   said transmission element is mounted on at least two bearing points with regard to said housing, and wherein:
   said element to be driven is in frictional contact with said transmission element at a point of engagement outside of the at least two bearing points, where a first section of said transmission element, which is located between said at least two bearing points, runs within said housing and a second section of said transmission element, which is located outside of the at least two bearing points, protrudes from said housing.

2. The electromechanical linear drive according to claim 1, wherein said electromechanical drive unit is arranged in said housing, and forms one of said at least two bearing points of said transmission element.

3. The electromechanical linear drive according to claim 1, wherein said electromechanical linear drive comprises:
   a guide element which forms one of said at least two bearing points of said transmission element, where said guide element mounts said transmission element to be slidable.

4. The electromechanical linear drive according to claim 3, wherein said guide element comprises:
   a part which is located within said housing and a part which is located outside of said housing.

5. The electromechanical linear drive according to claim 1, wherein said electromechanical linear drive comprises:
   a preloading device which is configured to preload said electromechanical drive unit against said housing.

6. The electromechanical linear drive according to claim 5, wherein said electromechanical linear drive comprises:
   an intermediate element which is firmly connected to said transmission element and which is arranged at least in sections between said transmission element and said electromechanical drive unit.

7. The electromechanical linear drive according to claim 1, wherein said electromechanical drive unit is made of at least one or more of piezoelectric or electrostrictive or magnetostrictive material.

8. The electromechanical linear drive according to claim 6, wherein said electromechanical drive unit has a ring shape or a hollow cylindrical shape and/or said transmission element is formed to be rod-shaped.

9. The electromechanical linear drive according to claim 6, wherein said intermediate element is connected to said transmission element and/or to said electromechanical drive unit in a positive substance-fit manner.

10. The electromechanical linear drive according to claim 3, wherein said transmission element is formed from a harder material than said guide element.

11. The electromechanical linear drive according to claim 10, wherein said transmission element protrudes with an interference fit through said guide element.

12. The electromechanical linear drive according to claim 1, wherein said first section of said transmission element is shorter than said second section of said transmission element.

13. The electromechanical linear drive according to claim 5, wherein said electromechanical drive unit is excitable to perform deformation motions by applying electrical voltages, where said transmission element follows the deformation motions of said electromechanical drive unit and resulting motions of said transmission element are transferable to said element to be driven so that the latter is movable with a defined thrust force along an axial direction of said transmission element.

14. The electromechanical linear drive according to claim 13, wherein the preload force applied by said preloading device onto said electromechanical drive unit is at least ten times the thrust force acting upon said element to be driven.

15. The electromechanical linear drive according to claim 2, wherein said electromechanical drive unit is arranged in said housing in a positive force-fit manner.

16. The electromechanical linear drive according to claim 1, wherein said guide element mounts said transmission element to be slidable in the axial direction, and where said guide element is configured as a bushing through which said transmission element protrudes.

17. The electromechanical linear drive according to claim 5, wherein said preloading device is configured to preload said electromechanical drive unit against an inner surface of said housing, and where said preloading device is configured to be screwed into said housing, includes a diaphragm spring.

18. The electromechanical linear drive according to claim 6, wherein said intermediate element is arranged at least in sections between said transmission element and said electromechanical drive unit in such a way that a preload force of said preloading device will be applied onto said electromechanical drive unit via said intermediate element.

19. The electromechanical linear drive according to claim 8, wherein said electromechanical drive unit has a ring shape or a hollow cylindrical shape and said transmission element is formed to be rod-shaped, with a circular cross-section, where said intermediate element is arranged to be concentric to said electromechanical drive unit.

20. The electromechanical linear drive according to claim 10, wherein said transmission element is made of ceramic material, and said guide element includes plastic material and/or made of plastic material, where the plastic material includes additives to improve sliding and/or reduce wear.

* * * * *